March 17, 1942.     T. C. BROMLEY ET AL     2,276,920
KNITTED FABRIC AND THE METHOD OF MAKING SAME
Filed Aug. 10, 1939     5 Sheets-Sheet 1
Fig. 1.
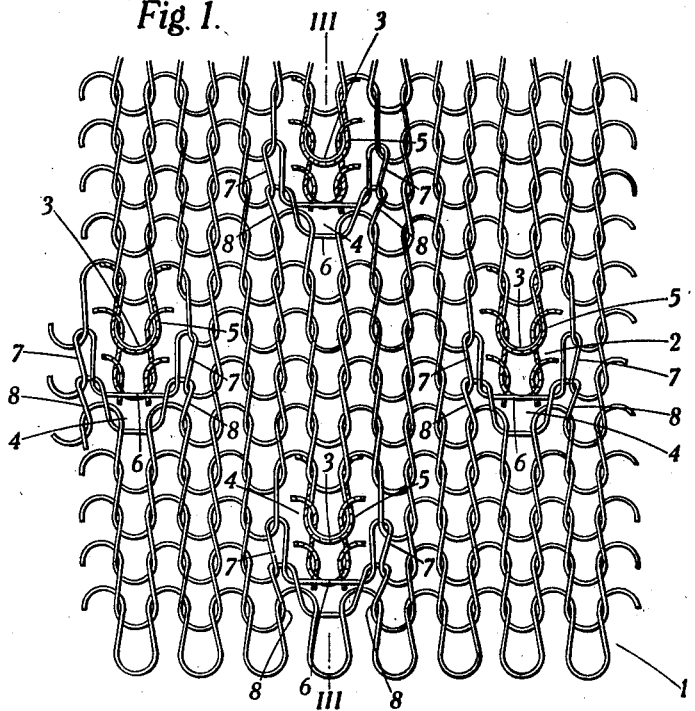
Fig. 2.
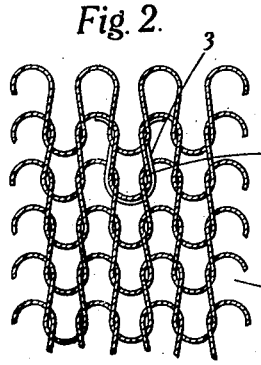
Fig. 3.
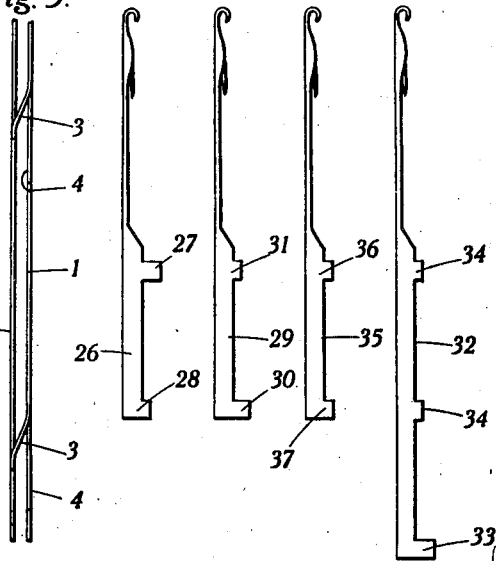
Fig. 5.
Inventors,
Thomas Charles Bromley
Arthur Shortland
Thomas A. M. Hill
Henry Hooper,
by Frank S. Appleman
ATTORNEY.

March 17, 1942.   T. C. BROMLEY ET AL   2,276,920
KNITTED FABRIC AND THE METHOD OF MAKING SAME
Filed Aug. 10, 1939   5 Sheets-Sheet 2
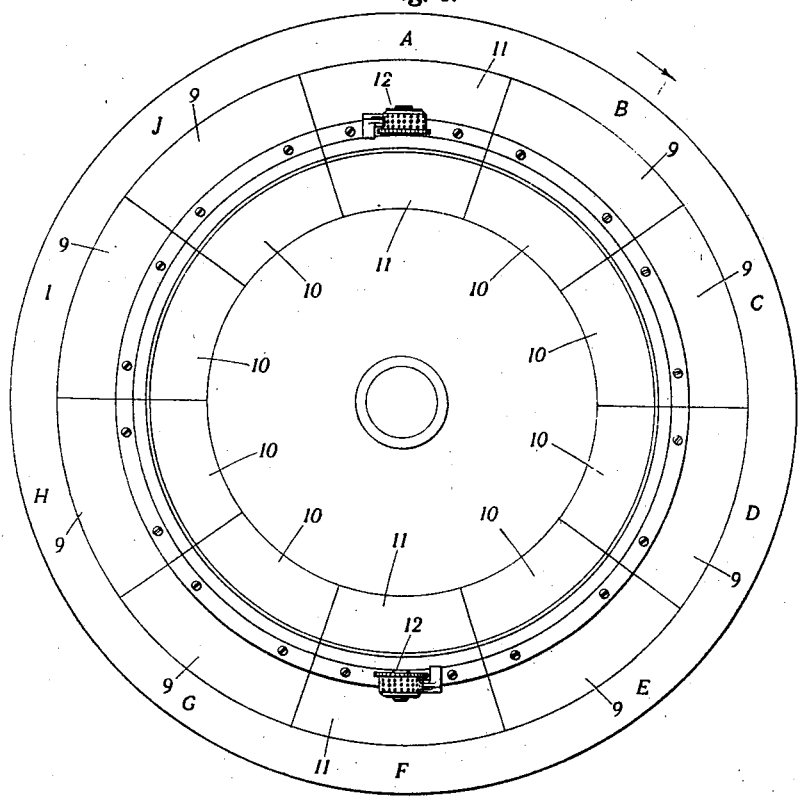
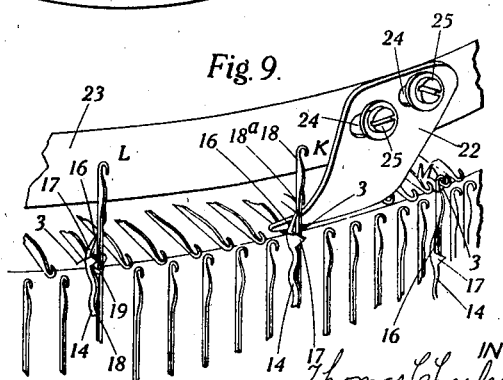
INVENTORS,
Thomas Charles Bromley,
Arthur Shortland,
Thomas A. M. Hill,
Henry Hooper,
ATTORNEY.

March 17, 1942.  T. C. BROMLEY ET.AL  2,276,920
KNITTED FABRIC AND THE METHOD OF MAKING SAME
Filed Aug. 10, 1939  5 Sheets-Sheet 4
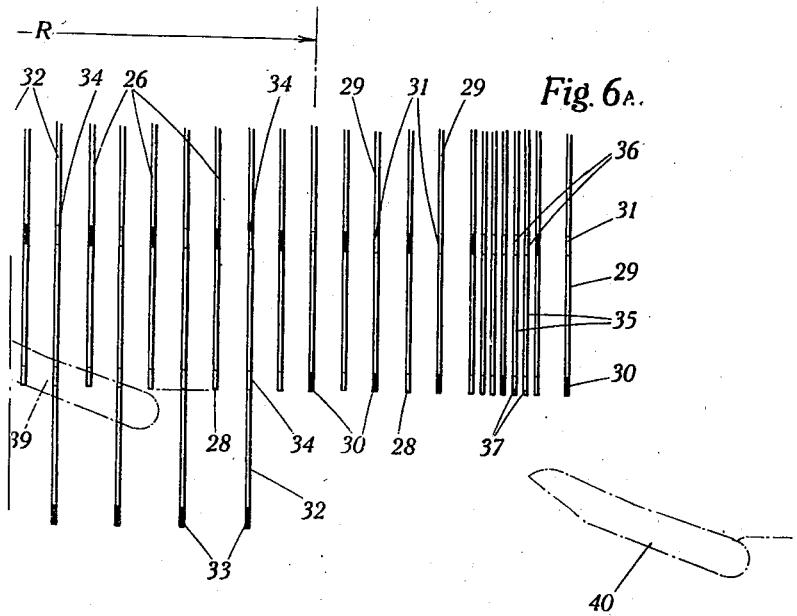
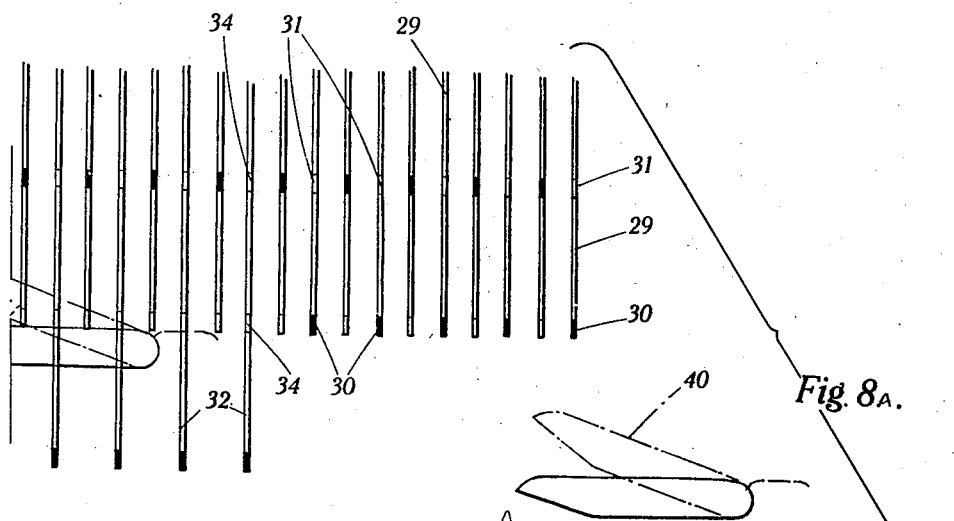
Inventors;
Thomas Charles Bromley,
Arthur Shortland,
Thomas A. M. Hill,
Henry Hooper,
BY Frank S. Appleman
ATTORNEY.
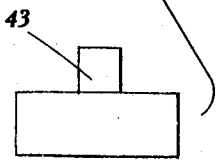

March 17, 1942. T. C. BROMLEY ET AL 2,276,920
KNITTED FABRIC AND THE METHOD OF MAKING SAME
Filed Aug. 10, 1939 5 Sheets-Sheet 5

INVENTORS,
Thomas Charles Bromley,
Arthur Shortland,
Thomas A. M. Hill,
Henry Hooper,
By Frank S. Ashmen,
ATTORNEY.

Patented Mar. 17, 1942

2,276,920

UNITED STATES PATENT OFFICE 2,276,920

KNITTED FABRIC AND THE METHOD OF MAKING SAME

Thomas Charles Bromley and Arthur Shortland, Leicester, Thomas Archibald Montgomerie Hill, Sutton Bonington, and Henry Hooper, Woodthorpe, England, assignors to Mellor Bromley & Co. Limited, Leicester, England, a British company, and C. L. K. Limited, London, England, a British company Application August 10, 1939, Serial No. 289,508
In Great Britain September 3, 1938

5 Claims. (Cl. 66—196)

The object of this invention is to provide an improved knitted fabric comprising wholly or in part independently knitted webs, walls or portions (hereinafter for brevity referred to as webs) joined or united at intervals, and an improved method of making such fabric.

It is known in the art to provide cellular fabric comprising a single knitted web with holes or interstices therein in the form of or for use in the manufacture of underwear for the purpose of keeping the wearer cool in warm weather by reason of the ventilating effect achieved through the medium of the holes or interstices, but underwear consisting of such fabric is not suitable for wear in cold weather such as is experienced in the winter.

It is also known to provide knitted fabric comprising two independently knitted webs produced by means of two independently knitted yarns on a machine having two sets of needles and joined or united at intervals by loops or stitches formed by causing one or more of the needles of one set to take the yarn fed to the other set so as to produce a stitch or stitches or simply a crossing loop or loops at required intervals.

The present invention comprises knitted fabric consisting wholly or in part of independently knitted webs and also of a cellular character in so far as it has holes or interstices in at least one of the webs and consequently can be produced in the form of or used in the manufacture of underwear suitable for wear all the year round instead of seasonally, but the invention is not to be regarded as limited in this respect as by suitable choice of yarns, fabric of the improved character may be produced in the form of or in a form suitable for manufacture into other articles of clothing in which the holes or interstices provide a patterned or fancy effect, or for other purposes. Accordingly the expression "knitted fabric" hereinafter employed in the following further description and in the appended claims is to be regarded as used in a generic sense including garments, or garment lengths such as are used for making outerwear and underwear, as well as to fabric produced in a continuous manner in the piece and intended to be cut up subsequently for making outerwear and other body garments and other purposes.

The invention is applicable to both flat and tubular knitted fabric, and the fabric may be produced on bearded needle knitting machines as well as latch needle weft knitting machines of the independent needle type having two sets of needles and means for feeding separate yarns to each, for instance the fabric may be made on a flat or straight bar rib knitting machine, or on a circular rib knitting machine, such for example as a machine of the cylinder and dial type with one or more than one feeder.

In order that the invention may be more clearly understood and readily carried into practical effect, a specific form of the improved fabric and also a particular method of and means for producing the same on a multi-feeder machine of the cylinder and dial type will now be described by way of example with reference to the accompanying drawings, wherein:

Figure 1 is a front view in diagrammatic form of a portion of the said fabric drawn to a greatly enlarged scale.

Figure 2 is a detail view of a portion of the back web of the fabric showing one of the connecting loops or stitches.

Figure 3 is a transverse sectional view taken on the line III—III of Figure 1.

Figure 4 is a plan view representing the layout of the feeders in the machine on which the aforesaid fabric is produced.

Figure 5 shows contrasting butt formations on the cylinder needles employed in the machine.

Figure 6:
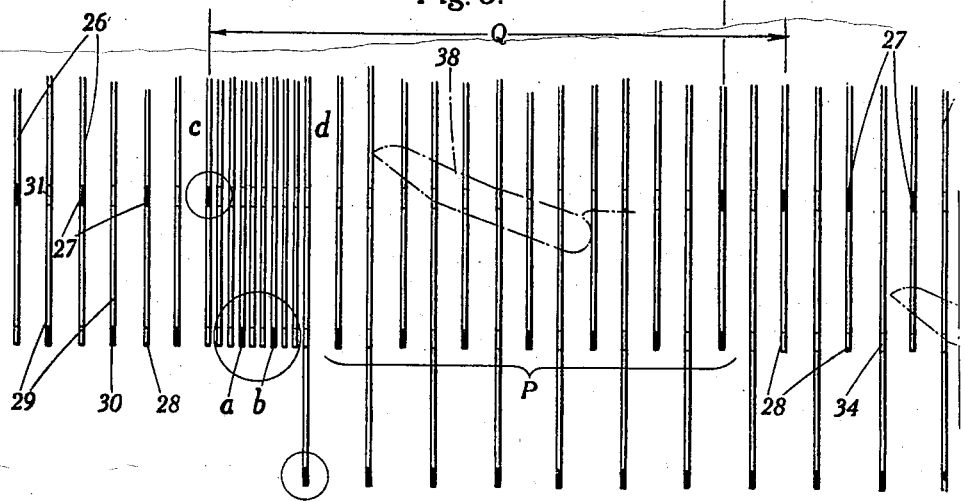

Figure 6 purports to illustrate in diagrammatic fashion the manner in which needles are initially set out in the cylinder of the machine.

Figure 6a is a view illustrating a continuation of Fig. 6.

Figure 7 is a diagram showing the relative spacing of the holes or interstices which are produced in a knitted web by transferring loops or stitches from prearranged cylinder needles to adjacent dial needles at successive revolutions of the machine in the manner hereinafter to be described.

Figure 8:
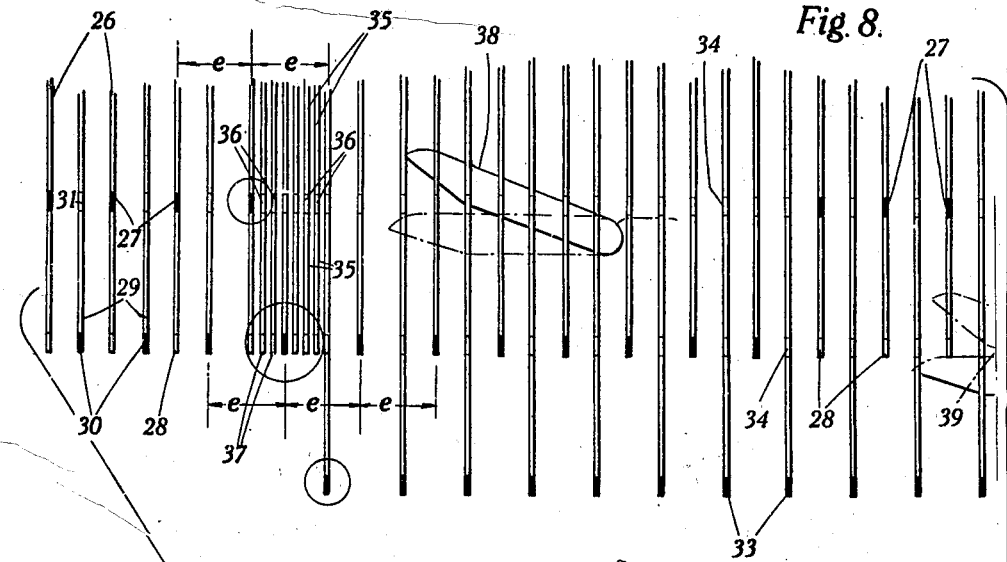

Figure 8 is a view somewhat similar to Figure 6 representing the final set out of the cylinder needles, and also showing the cam and associated means whereby appropriate cylinder needles are operated to effect transference of loops or stitches.

Figure 8a is a view illustrating a continuation of Fig. 8.

Figure 9 is a detail perspective view representing loop transferring instruments employed in association with prearranged cylinder needles and the manner in which these function for the intended purpose.

Figure 10:
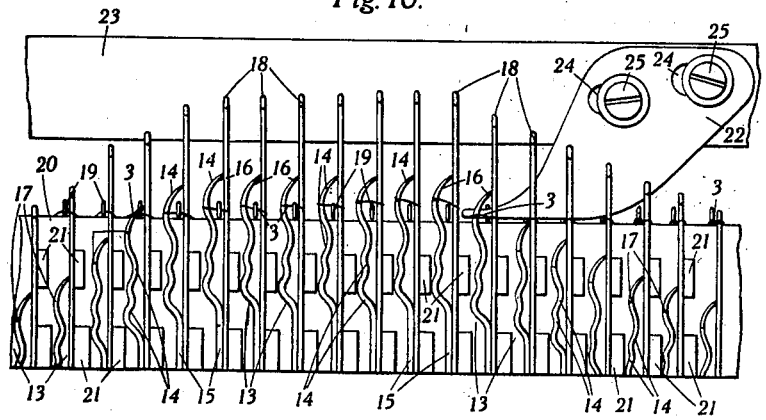

Figure 10 shows loop transferring instruments and companion needles in different positions during a loop transferring operation, and the formation of the tricks in the needle cylinder to receive such instruments.

Figure 11:
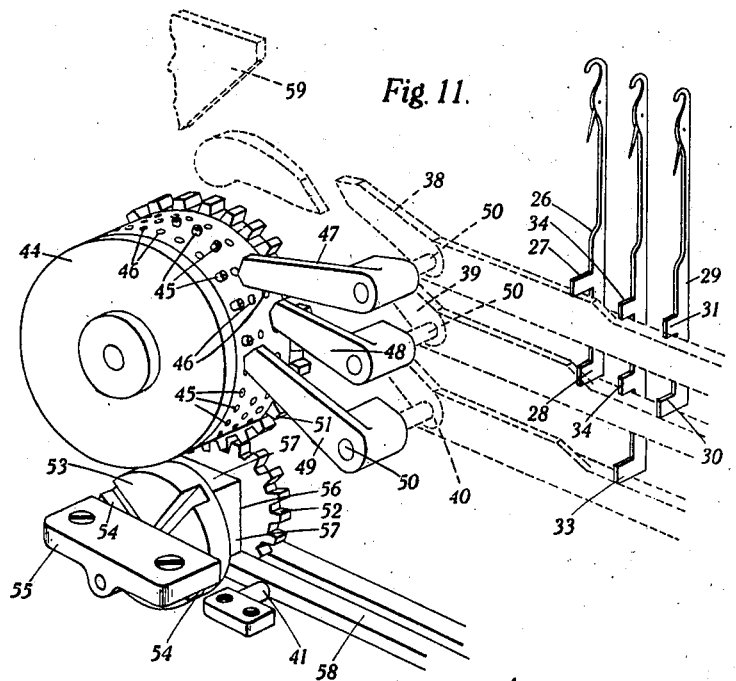

Figure 11 is a general perspective view of the pattern mechanism employed for selectively operating the loop transferring instruments and companion needles.

Like parts are designated by similar reference characters throughout the drawings.

Referring to Figures 1, 2 and 3, it will be seen that the fabric illustrated by way of example comprises independently knitted front and back webs 1 and 2 respectively joined or united at intervals by means of connecting loops or stitches 3, said fabric having holes or interstices 4 which are produced as hereinafter set forth by interruption of the knitting constituting the front web 1. Conveniently the holes or interstices 4 which, as shown, are more or less pear-shaped, are produced by the transference of the loops or stitches 3 connecting the back web 2 with the front web 1.

In the improved fabric the holes or interstices may be disposed in close or widely distributed order, regular or irregular. For instance, the holes or interstices may be disposed so as to form rows of horizontal, vertical or diagonal disposition, or any combination thereof, or a pattern or design according to desire. Thus in the fabric a portion of which is shown, the holes or interstices 4 are disposed in comparatively closely distributed regular order and in such a way as to form horizontal rows, the holes or interstices in one row, however, being staggered in relation to those in the next row, and so on.

Apart from the provision of the holes or interstices 4 in the front web 1 each web consists, as will be observed from a consideration of Figures 1 and 2, of a structure of plain loops.

The independently knitted webs whether in the specific form of the fabric shown or otherwise may be knitted respectively from yarns of different characteristics. For instance, in the case of underwear fabric the one web may be knitted from yarn having good hygroscopic properties while the other web may be knitted from yarn of another character such as an artificial silk yarn. In fabric for other purposes the said webs may be knitted from yarns which contrast as regards colour, thereby enhancing the fancy appearance of the fabric. Thus there may be produced fabric the structure or/and appearance or/and feel of one side of which contrasts with that of the other side.

In the improved knitted fabric each hole or interstice such as 4 may be produced by one (as shown) or more transferred loops or stitches such as 3, and similarly each joining of the independently knitted webs may be constituted by one or more transferred loops or stitches, the size and shape of the holes or interstices and the character of the joining being determined by the number and manner of transference of the transferred loops or stitches.

As will be seen in Figures 1 and 2 each of the connecting loops or stitches 3 when transferred is knitted together with a loop or stitch 5 in the back web 2 and it is in this way that the two webs are joined or united. Moreover, for the sake of convenience in Figure 1 only a few loops or stitches of the said back web are shown and, with a view to distinguishing the two webs more clearly, the loop structure constituting the back web is lightly shaded whilst the structure constituting the front web has been left unshaded. By reason of the loops or stitches 3 being transferred the portions 6 of yarn which, had not the knitting of the front web 1 been interrupted, would normally have been formed into loops and drawn through said loops or stitches form straight bights or floats, and adjacent loops or stitches such as those indicated at 7 and 8 become deformed thereby opening out the fabric and providing the required holes or interstices 4.

It will be noted that in the portion of fabric illustrated the transferred connecting loops or stitches 3 in each row are spaced six needle wales apart; that is to say there are five clear needle wales between successive loops or stitches 3 in a row. The horizontal rows of holes or interstices 4 are spaced at intervals of four courses. It is important that the reader shoud bear these facts in mind and compare them with the knitting action hereinafter to be described.

According to one method of producing the improved fabric the aforesaid two sets of needles are caused to knit alternately and loops or stitches are transferred from needles of one set to needles of the other set at appropriate times, for example, in the intervals between knitting on one set and knitting on the other set. For instance, in a machine of the cylinder and dial type the dial needles and the cylinder needles may be caused to knit alternately and loops or stitches may be transferred from cylinder needles to dial needles, or from dial to cylinder needles, or both. For example, in a cylinder and dial machine having two or any convenient greater number of feeders, the dial needles are caused to knit at one feeder while the cylinder needles miss knitting at said feeder, then the cylinder needles are caused to knit at the other or the next feeder while the dial needles miss knitting at that feeder, and so on, this cycle of operations being performed any number of times, with transference of loops or stitches from cylinder needles to dial needles at intervals according to requirements.

The fabric hereinbefore described with reference to Figures 1, 2 and 3 may conveniently be made on a ten feeder cylinder and dial machine, the layout of the feeders of which is shown in Figure 4. In this figure cylinder knitting sections are represented at 9 and dial knitting sections at 10. The reference numerals 11 indicate sections at which patterning mechanism 12 is provided for selectively operating the transfer elements or/and needles or associated jacks according to the effect to be produced in the knitted fabric. The first feeder of the machine will be referred to as the feeder A (see Figure 4), the second feeder as the feeder B, and so on up to the tenth feeder which will be referred to as the feeder J. Thus, in the specific layout shown, a patterning mechanism 12 is provided at the first and sixth feeders A and F respectively, although in making the fabric shown in Figures 1, 2 and 3 it is only necessary to employ the mechanism provided at the feeder A. To produce the said fabric there may be knitting on dial needles only at the feeders B, D, G and I and on cylinder needles only at the feeders C, E, H and J with transference of loops or stitches from prearranged or selected cylinder needles to adjacent dial needles effected by means of the patterning mechanism 12 adjacent to the first feeder A. The transference may, if desired, be effected at more than one feeder, according to requirements. Yarns are fed separately to the cylinder and dial needles. By knitting on cylinder needles at four feeders and similarly on dial needles at another four feeders, four courses of knitting are produced in each web of the fabric at each revolution of the machine. After a needle has transferred its loop or stitch to another needle it does not straightway resume knitting. It must first take yarn at the appropriate time and subsequently take yarn again at the same feeder or at another appropriate feeder, as the case may be, before it can form another knitted loop or stitch. In effect, therefore, knitting is temporarily interrupted on such needle.

As will be understood, there may be transference of loops or stitches from cylinder needles to other cylinder needles or/and from dial needles to other dial needles, instead of or as well as transference of loops or stitches from cylinder needles to dial needles or/and vice versa. In producing fabric of the specific form herein described, however, there is merely transference of loops or stitches from cylinder needles to dial needles.

Convenient forms of loop transferring instruments and means for operating same which may be adopted are described in the specifications of British Letters Patent Nos. 401,448 and 478,969, such arrangements being for the purposes of the present invention adapted periodically to effect transference of needle loops or stitches or/and sinker wale loops to prearranged needles of the other or the same set, but transfer instruments and operating means of any other known form may be adopted. In Figures 9 and 10 are shown by way of example, the upper portions of loop transferring instruments of the form described in Specification No. 478,969 aforesaid. As will be seen, each of said instruments 13 is made with a laterally waved or undulated formation comprising a plurality of undulations 14 extending lengthwise of the instrument from the operative end thereof. The undulations are formed so as to be located mainly on one side of the stem 15 of the instrument with the extremity or tip 16 and the crests of the inward undulations being disposed more or less in alignment with the said stem. Each loop transferring instrument, moreover, has a loop engaging shoulder 17 of angular form at a suitable distance from the tip 16 as shown more clearly in Figure 9. In the machine for producing the improved fabric one of the loop transferring instruments just described is provided in association with each of a plurality of prearranged cylinder needles 18 from which loops or stitches are to be transferred to adjacent dial needles 19. Conveniently each of the appropriate grooves or tricks in the cylinder 20 (the upper portion of which is shown in Figure 10) is made wider than usual so that one of the instruments 13 can be located side by side contiguously with the companion cylinder needle 18. The loop transferring instruments are furnished with butts (not shown) for engagement with cams and/or other means for operating the same, and each cylinder needle 18 from which loops or stitches are to be transferred has a groove 18a in it at one side of the stem to receive the point or tip 16 of the companion instrument 13. Pairs of projecting pieces such as 21 may conveniently be formed on or provided in the cylinder 20 above the grooves or tricks therein and so arranged as to receive and guide the loop transferring instruments and companion needles (see Figure 10). There may be one or more pairs of such projecting pieces in association with each groove or trick. The instruments 13 and companion needles work together, that is to say there is no relative longitudinal movement between them. At K in Figure 9 a cylinder needle and companion loop transferring instrument are shown as they appear when raised to such a height that a loop or stitch 3 on said needle becomes expanded over the instrument and engaged by the shoulder 17 of the latter. During expansion of a loop or stitch in this way it is held down in any suitable manner—conveniently, and as shown, by means of a holding down plate 22. In the example shown this plate is mounted on the dial cam plate 23 and slotted as at 24 for reception of screws 25 so as to enable it to be appropriately adjusted according to requirements. At L a needle 18 and associated instrument 13 are being lowered so as ultimately to leave the loop or stitch 3 hanging on the adjacent dial needle 19. A needle and companion instrument as they appear at the commencement of a loop transferring operation are indicated at M. Figure 10 purports to trace the movement of a single cylinder needle and companion loop transferring instrument from the time these commence to rise, at the beginning of a loop transferring operation, until they descend again and thereby effect transference of a loop or stitch 3.

In the cylinder and dial machine for producing the specific form of fabric hereinbefore described the cylinder needles are prearranged so that every sixth cylinder needle (with a few exceptions to be mentioned hereinafter) has associated with it a loop transferring instrument and is adapted to be operated at appropriate times to transfer a loop or stitch to the adjacent dial needle. The said prearranged cylinder needles, however, are so formed with contrasting butt formations and transfer cam means for action upon these formations are so operated as, in the result, to cause alternate ones of the prearranged needles to transfer their loops or stitches at one revolution of the machine and the remaining prearranged needles similarly to transfer their loops or stitches at the next revolution, and so on.

It is convenient to provide in the machine cylinder needles of four different forms, viz. transfer needles 26 having long top butts 27 and short bottom butts 28, transfer needles 29 having long bottom butts 30 and short top butts 31, transfer needles 32 which are longer than the remaining cylinder needles and have long bottom butts 33 and two short spaced top butts 34, and ordinary non-transfer needles 35 having short top and bottom butts 36 and 37 respectively (see Figure 5). For the sake of convenience in the following further description the needles 26 will be referred to as "long top butt transfer" needles, the needles 29 as "long bottom butt transfer" needles, the needles 32 as "special three-butt transfer" needles, and the needles 35 as "non-transfer" needles. In the case of all the cylinder needles the short butts are provided for ordinary knitting purposes, while the long butts are the ones which are acted upon by the transfer cam means. In setting out the cylinder needles in the machine the long top butt transfer needles 26 are spaced at intervals of six needles apart nearly all around the cylinder. That is to say, there are five needles between successive needles 26. Long bottom butt transfer needles 29 are set out in the cylinder in such a way that—nearly all around the latter—said needles occupy positions midway between successive long top butt transfer needles. Thus, referring to the right hand side of Figure 6, it will be seen that between two successive long top butt transfer needles there is a centrally disposed long bottom butt transfer needle and on each side of the latter, two non-transfer needles. This prearrangement of cylinder needles is continued around all but a comparatively small circumferential extent of the cylinder in which portion of the latter the set out is somewhat different and includes a few, e. g. fifteen as shown, special three-butt transfer needles 32 as and for the purpose hereinafter to be explained. It is convenient to mention here that with a view to enabling the long butts to be clearly distinguished in each of Figures 6 and 8 they have been blacked in—all the short butts being left white. A movable transfer cam 38 of the swing type is provided for raising the spaced long top butt transfer needles 26 to transfer height (together with the companion loop transferring instruments), while a separate and similar transfer cam 39 is provided for raising to the same height the long bottom butt needles 29. When the machine is in operation the swing cams 38 and 39 are rendered operative and inoperative suchwise that the needles 26 are caused to transfer their loops or stitches to adjacent dial needles at one revolution of the machine, whilst at the next revolution the needles 29 are similarly caused to transfer. This will be clearer from a consideration of Figure 7 wherein there is represented the spacing of the holes or interstices produced in a knitted web by operating the transfer needles in the order mentioned. Thus, assuming that the row N of holes or interstices is produced by causing long top butt transfer needles to transfer at one revolution, then at the next revolution the row O of holes or interstices would be produced by causing bottom long butt transfer needles to transfer, and so on.

However, in order to facilitate an accurate change over from operation (for loop transferring purposes) of long top butt transfer needles and companion loop transferring instruments to similar operation of long bottom butt transfer needles and associated instruments, and vice versa, at successive revolutions of the machine, fifteen special three-butt transfer needles 32 are provided in place of seven of the needles 26 and eight of the needles 29 as shown in Figure 16. It is to be understood that these numbers are given merely by way of example, since more or less than fifteen of the needles 32 may be provided in the cylinder, and the respective numbers of needles 26 and 29 replaced by the special three-butt transfer needles may, in any event, be varied, according to convenience. Moreover, seven of the long top butt needles are removed and replaced by seven long bottom butt needles as indicated at P. The set out just described is such as to provide a space Q of, say, 4½ inches in circumferential extent devoid of long top butt transfer needles and also a similar space R devoid of long bottom butt transfer needles. These spaces Q and R are provided to enable the swing cams 38 and 39 to be readily moved up and down to render them respectively operative and inoperative. A third movable, e. g. swing, transfer cam 40 is employed to raise the fifteen special three-butt needles to transfer height as and when required. It is to be clearly understood that whilst for the sake of convenience in illustration the three transfer cams 38, 39 and 40 are shown in each of Figures 6 and 8 as being spaced apart in a circumferential direction, they are, in practice, disposed one above the other in the manner shown in Figure 11.

The cylinder needle set out last described is merely a preliminary one. The final set out and the order in which the three transfer cams are rendered operative and inoperative will now be described with reference to Figure 8. Such final set out of the needles is desirable since, referring for a moment to Figure 6, the preliminary set out results in an irregular spacing of transfer needles in the region of the change over point. Thus, as will be seen, the needles indicated at *a* and *b* and ringed round by a single circle are only three needles apart, whilst the needles indicated at *c* and *d* and ringed round by two somewhat smaller circles are nine needles apart. This irregularity may conveniently be avoided by removing the needle *b* and moving several adjacent transfer needles to provide in this region seven instead of six needle spacing. The effect of such spacing is indiscernible in the finished fabric. The reference letters *e* between transfer needles at the change-over location serve to indicate which needles have been spaced apart to the extent of seven instead of six needles.

The elements 41, 42 and 43—shown in diagrammatic fashion in Figure 8—purport to represent striker studs, pins or the equivalent which are provided on any suitable rotatable part of the machine and adapted, as the machine revolves, to effect intermittent rotation of a control drum 44 furnished with pins or pegs 45 for controlling the operation of the three transfer swing cams 38, 39 and 40 all as will be hereinafter more fully described with reference to Figure 11. Accordingly, there are three transfer cam changes at each revolution of the machine. These changes are briefly as follows:

Assume that initially the cams 39 and 40 are inoperative, i. e. in the horizontal full line positions indicated in Figure 8, but that the cam 38 is, as stated, in its operative, i. e. raised, position so that it raises the long top butt needles 26 and companion loop transferring instruments 13 up to transfer. Then, the first three changes effected at the first revolution of the machine are:

*First change.*—The lower swing cam 40 is rendered operative, i. e. moved to the dot-and-dash line position, by reason of the control drum 44 being appropriately operated from the striker element 43, so that said cam is ready to raise the special three-butt transfer needles and companion loop transferring instruments, the cam 38 meanwhile remaining operative.

*Second change.*—The upper swing cam 38 is rendered inoperative as a result of rotation of the control drum 44 effected by the moving striker element 41; the lower swing cam 40 at this stage takes over the transfer by raising the special three-butt needles 32, whilst the middle transfer cam 39 remains inoperative.

*Third change.*—The cam 39 is rendered operative by virtue of the striker element 42 effecting appropriate rotation of the drum 44 and thereby takes over the transfer by raising long bottom butt needles 29, the cams 38 and 40 meanwhile remaining inoperative and operative respectively.

The next three changes, effected at the second revolution of the machine, are:

*Fourth change.*—The lower swing cam 40 is rendered operative by reason of the rotation of the control drum 44 effected by the striker element 43, the cam 39 meanwhile remaining operative and the cam 38 being inoperative.

*Fifth change.*—The upper swing cam 38 is rendered operative, due to the striker element 41 effecting suitable movement of the control drum, and is thereby caused to take over the transfer by raising long top butt needles 26; meanwhile the cam 39 is still operative and the cam 40 inoperative.

*Sixth change.*—The centre transfer cam 39 is rendered inoperative by the action of the striker element 42, while the cam 38 is still operative and raising needles and the cam 40 is inoperative.

The foregoing six cam changes are repeated at the next two revolutions of the machine, and so on.

In each of Figures 6 and 8 the direction of rotation of the cylinder and dial is indicated by an arrow.

As will be appreciated, the control drum 44 constitutes part of the mechanism 12 provided adjacent to the first feeder A aforesaid. Conveniently this drum is rotatably mounted on a part of, on or adjacent to the cylinder cam box and is formed with three circumferential and parallel rows of tapped holes 46 adapted for reception of the operating pins or pegs 45. These pins or pegs are prearranged on the drum according to the required disposition of the holes or interstices to be produced in the fabric. Located in the paths of different series of pins or pegs are three comparatively short levers 47, 48 and 49 which are arranged in respectively different vertical planes and each secured to the outer end of a spindle 50. The transfer cams 38, 39 and 40 are rigidly secured to the inner ends of these spindles and the latter are mounted in the cylinder cam box in such a way as to be capable of turning movement therein. The arrangement is conveniently such that movements of the levers 47, 48 and 49 effect corresponding movements of the cams 38, 39 and 40 respectively. Thus, for instance if, due to rotation of the control drum 44 to an appropriate extent, an operating pin or peg 45 is moved under, say, the lever 47, then this lever and hence also the corresponding cam 38 will be raised to render the latter operative. Conversely, upon a pin or peg moving from beneath the free end of the lever 47 the latter and also the cam 38 are permitted to drop, said cam thereby being returned to its inoperative position. The drum 44 is conveniently geared, through two intermeshing spur gears 51 and 52, to a small slotted wheel 53 which is somewhat like the driven wheel of a Geneva motion. This wheel is formed with a plurality, e. g. four, radially extending and equally spaced slots 54 adapted for engagement with the three striker elements 41, 42 and 43. The wheel 53, moreover, is rotatably mounted in or on a suitable bracket or like support such as 55 fixed on the conventional bottom flange (not shown) of the needle cylinder and is secured to the spur gear 52. Consequently, when the machine is in operation, the striker elements 41, 42 and 43 (which may conveniently be fixed upon the headwheel of the machine) engage in successive slots 54 and effect intermittent rotation of the wheel 53. Movement of which latter is, of course, transmitted to the control drum through the gearing. For the purpose of locking the wheel 53 and thereby preventing rotation thereof during idle periods, said wheel has formed or provided thereon a square-shaped block 56 which, each time the wheel is racked around by a striker element, presents one of its flat faces 57 to any suitable rotatable part such as 58 of the machine (see Figure 11). This part is, however, recessed or gapped at appropriate locations to permit of freedom of movement of the block 56 at such times as the wheel 53 is being racked round.

In Figure 11 one each of the three different forms of cylinder needles employed in the machine are shown and the cams and cam tracks adjacent to the pattern mechanism are represented in dot-and-dash lines. The cam 59 is provided for effecting completion of loop transferring operations by depressing transfer needles and companion loop transferring instruments which have been raised by a transfer cam. The striker element 43 is arranged so as to be diametrically opposite the striker element 41.

It is mainly the intention to carry the invention into practice on circular independent needle knitting machines of the rotary needle cylinder type, but machines of the stationary cylinder type may be used.

In any event prearranged or selected needles in one or in both beds may be supplied with one yarn and operated so that an area or areas of plain fabric or/and any conventional stitch variation thereof, or/and an area or areas of normal or fancy ribbed fabric is or are produced in combination with an area or areas comprising independently knitted webs of the improved character hereinbefore described.

It is also principally the intention to produce the improved fabric on rib knitting machines of the type wherein the needles of one bed alternate with the needles of the other bed. If desired, such machines may be provided with means for shogging one or each bed so as to bring the needles in one bed into alignment with or directly opposite to those in the other bed to facilitate loop or stitch transference and other functions.

What we claim then is:

1. A knitted fabric comprising independently knitted webs, and transferred loops connecting one web with the other in such a manner as to leave holes in at least one of the webs.

2. A knitted fabric comprising independently knitted webs, and transferred loops connecting one web with the other in such a manner as to leave holes in at least one of the webs, said holes being so disposed as to form rows of horizontal disposition.

3. A knitted fabric comprising independently knitted webs, and transferred loops connecting one web with the other in such a manner as to leave holes in at least one of the webs, said holes being so disposed in regular order as to form horizontal rows, the holes in one row being staggered in relation to those in the next row, and so on.

4. A knitted fabric comprising independently knitted webs, one of said webs being of a plain stitch formation and the other web having therein holes which are produced by transferred loops connecting one web with the other.

5. A knitted fabric comprising independently knitted webs which are knitted respectively from yarns of different characteristics, and transferred loops connecting one web with the other in such a way as to leave holes in at least one of the webs.

THOMAS CHARLES BROMLEY.
ARTHUR SHORTLAND.
THOMAS ARCHIBALD
          MONTGOMERIE HILL.
HENRY HOOPER.